US012076886B2

(12) United States Patent
Youngblood et al.

(10) Patent No.: US 12,076,886 B2
(45) Date of Patent: Sep. 3, 2024

(54) TRANSPARENT ALUMINA-BASED PLATE AND METHOD OF MAKING THEREOF

(71) Applicant: Purdue Research Foundation, West Lafayette, IN (US)

(72) Inventors: Jeffrey Paul Youngblood, West Lafayette, IN (US); Rodney Wayne Trice, West Lafayette, IN (US); Andrew Schlup, West Lafayette, IN (US); William Costakis, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 721 days.

(21) Appl. No.: 17/121,840

(22) Filed: Dec. 15, 2020

(65) Prior Publication Data

US 2021/0362369 A1    Nov. 25, 2021

Related U.S. Application Data

(60) Provisional application No. 62/983,816, filed on Mar. 2, 2020.

(51) Int. Cl.
| | |
|---|---|
| *B28B 3/02* | (2006.01) |
| *C01F 7/027* | (2022.01) |
| *C04B 35/115* | (2006.01) |
| *C04B 35/626* | (2006.01) |
| *C04B 35/645* | (2006.01) |

(52) U.S. Cl.
CPC ............. *B28B 3/025* (2013.01); *C01F 7/027* (2013.01); *C04B 35/115* (2013.01); *C04B 35/62605* (2013.01); *C04B 35/645* (2013.01); *C01P 2002/72* (2013.01); *C01P 2004/03* (2013.01);

(Continued)

(58) Field of Classification Search
CPC .......... C04B 2235/5292; C04B 35/115; C04B 35/645; C04B 35/10–119; C01P 2004/20
See application file for complete search history.

(56) References Cited

U.S. PATENT DOCUMENTS

| | | |
|---|---|---|
| 3,026,210 A | 3/1962 | Coble |
| 2012/0237439 A1* | 9/2012 | Rouleau .............. C04B 38/0054 423/628 |
| 2018/0244579 A1* | 8/2018 | Watanabe ........... C04B 35/6455 |

OTHER PUBLICATIONS

Sokolov A. S. et al., 3D crystallographic alignment of alumina ceramics by application of low magnetic fields. Journal of the European Ceramic Society, 38(15), Dec. 2018, pp. 5257-5263.

* cited by examiner

*Primary Examiner* — Erin Snelting
(74) *Attorney, Agent, or Firm* — Purdue Research Foundation

(57) ABSTRACT

The present disclosure provides a transparent alumina-based plate, and a hot-pressing method to make the transparent alumina-based plate from platelet alumina. Alumina powder with a platelet morphology was hot-pressed to transparency with pre-load pressures of about 0-8 MPa, maximum temperatures of about 1750-1825° C., maximum pressures of about 2.5-80 MPa, and isothermal hold times of 1-7 hours. A novel alumina-based plate has been prepared, wherein the plate has a thickness of 2-5 mm, an in-line transmission of at least 60-75% for a light with a wavelength range of 645-2500 nm, an in-line transmission variance of <15% over the wavelength range of 645-2500 nm, and a relative density of 99.00-99.95%.

7 Claims, 13 Drawing Sheets

(52) U.S. Cl.
CPC .. *C01P 2004/20* (2013.01); *C04B 2235/5292* (2013.01)

TRANSPARENT ALUMINA-BASED PLATE AND METHOD OF MAKING THEREOF

CROSS-REFERENCE TO RELATED APPLICATION

This patent application claims the priority benefit of U.S. Provisional Application No. 62/983,816, filed Mar. 2, 2020, and the content of which is hereby incorporated by reference in its entirety.

GOVERNMENT RIGHT

This invention was made with government support under W911NF-17-1-0203 awarded by the Army Research Office. The government has certain rights in the invention.

TECHNICAL FIELD

The present application generally relates to a transparent alumina-based plate, and a hot-pressing method to make the transparent alumina-based plate from platelet alumina.

BACKGROUND

This section introduces aspects that may help facilitate a better understanding of the disclosure. Accordingly, these statements are to be read in this light and are not to be understood as admissions about what is or is not prior art.

Transparent alumina is a candidate for protection applications, such as nose cones, radomes, and ballistic blast shields. Alumina can reach optical transparency at high relative densities. However, alumina is birefringent due to its anisotropic rhombohedral crystal structure, causing light scattering at the grain boundaries and limiting transparency. It has been shown that light scattering from birefringence can be minimized by aligning alumina powders along the same crystallographic direction with a high magnetic field prior to densification. While this alignment method is effective, it may be limited in terms of scalability as the high magnetic fields required (>12T) can only be obtained in small volumes. Therefore, there is a need to investigate other methods of alignment.

SUMMARY

In one embodiment, the present disclosure provides a method of preparing a transparent alumina-based plate by hot-pressing platelet alumina, wherein the method comprises:
  providing a platelet alumina powder sample, wherein the platelet alumina powder sample is optionally purified by washing with an organic solvent and then by heating to remove the organic solvent;
  providing a die for hot-pressing, wherein the die is placed in a furnace chamber;
  loading the platelet alumina powder sample into the die;
  uniaxially pressing the platelet alumina powder sample to initially consolidate the platelet alumina powder;
  providing a low pre-load pressure of 0-8 MPa onto the die before a sintering temperature is reached;
  providing a pressure to the sample until a maximum pressure of 2-90 MPa is reached;
  holding the maximum temperature and the maximum pressure for a period of time to ensure adequate density; and
  cooling the sample and removing the pressure to provide a hot-pressed alumina-based plate with at least 60% in-line transmission for a light with a wavelength of 645 nm.

In one embodiment, the present disclosure provides an alumina-based plate, wherein the plate has a thickness of 2-5 mm, an in-line transmission of at least 60-75% for a light with a wavelength range of 645-2500 nm, an in-line transmission variance of <15% over the wavelength range of 645-2500 nm, and a relative density of 99.00-99.95%.

DETAILED DESCRIPTION

Figure 1:
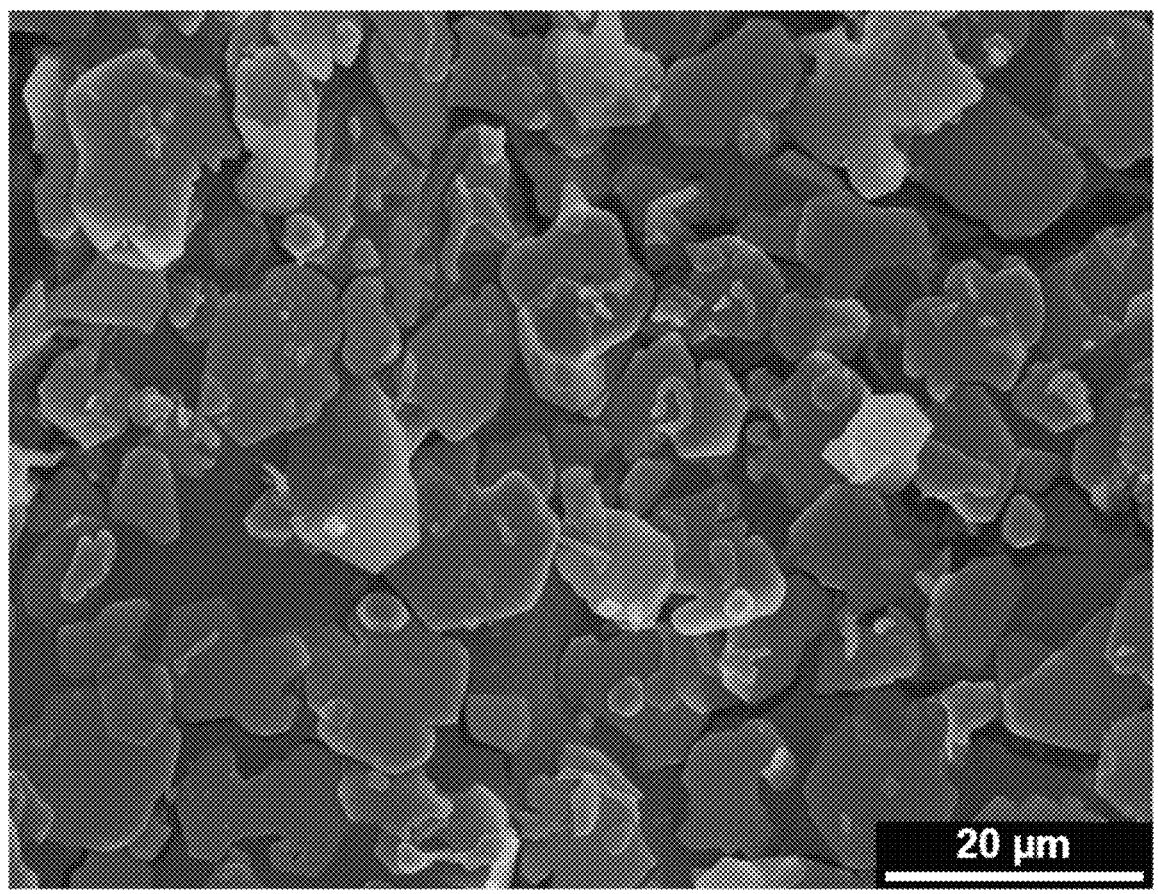
FIG. 1 illustrates SEM micrograph of ethanol-washed (P1) RonaFlair platelet-morphology alumina powder.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The present application generally relates to a transparent alumina-based plate, and a hot-pressing method to make the transparent alumina-based plate from platelet alumina.

In this disclosure, alumina powder with a platelet morphology was hot-pressed to transparency with pre-load pressures of 0-8 MPa, maximum temperatures of 1750-1825° C., maximum pressures of 2.5-80 MPa, and isothermal hold times of 1-7 hrs. Optical transmission (in-line and total), as well as optical losses (backward/forward scattering and absorption), of the hot-pressed samples were measured and related to the microstructure. Higher hot-pressing temperatures increase the in-line transmission. A gray discoloration of the samples (indicative of high absorption) was minimized by heat-treating the powder in air prior to hot-pressing and reducing the pre-load pressure. Maximum pressures above/below 10 MPa increased porosity, which decreased in-line transmission and increased backward/forward scattering. Lower densities at higher pressures are attributed to a pore-swelling phenomenon. Increasing isothermal hold time decreased porosity, which increased in-line transmission and reduced backward/forward scattering. Best optical properties with an in-line transmission of 65.3% at 645 nm (0.8 mm thick) were achieved by hot-pressing heat-treated platelet alumina powder with a pre-load pressure of 0 MPa, maximum temperature of 1800° C., maximum pressure of 10 MPa, and an isothermal hold time of 7 hrs. This high in-line transmission, despite its large grain size (65 μm), is attributed to crystallographic orientation of the platelets during hot-pressing.

In one embodiment, the present disclosure provides a method of preparing a transparent alumina-based plate by hot-pressing platelet alumina, wherein the method comprises:
  providing a platelet alumina powder sample, wherein the platelet alumina powder sample is optionally purified by washing with an organic solvent and then by heating to remove the organic solvent;
  providing a die for hot-pressing, wherein the die is placed in a furnace chamber;
  loading the platelet alumina powder sample into the die;
  uniaxially pressing the platelet alumina powder sample to initially consolidate the platelet alumina powder;
  providing a low pre-load pressure of 0-8 MPa onto the die before a sintering temperature is reached;
  providing a pressure to the sample until a maximum pressure of 2-90 MPa is reached;
  holding the maximum temperature and the maximum pressure for a period of time to ensure adequate density; and
  cooling the sample and removing the pressure to provide a hot-pressed alumina-based plate with at least 60% in-line transmission for a light with a wavelength of 645 nm.

In one embodiment regarding the method of preparing a transparent alumina-based plate, wherein the platelet alumina powder sample is first washed by ethanol and then heated to 100-1300° C. to remove impurities and to allow the sample to densify more easily.

In one embodiment regarding the method of preparing a transparent alumina-based plate, wherein the pre-load pressure is 0-1 MPa.

In one embodiment regarding the method of preparing a transparent alumina-based plate, wherein the maximum pressure if 75-85 MPa.

In one embodiment regarding the method of preparing a transparent alumina-based plate, wherein the sintering temperature is 1800-1825° C.

In one embodiment regarding the method of preparing a transparent alumina-based plate, wherein the time for holding the maximum temperature and the maximum pressure is at least 5 hours.

In one embodiment regarding the method of preparing a transparent alumina-based plate, wherein the maximum pressure is 5-15 MPa.

In one embodiment, the present disclosure provides an alumina-based plate, wherein the plate has a thickness of 2-5 mm, an in-line transmission of at least 60-75% for a light with a wavelength range of 645-2500 nm, an in-line transmission variance of <15% over the wavelength range of 645-2500 nm, and a relative density of 99.00-99.95%.

In one embodiment regarding the alumina-based plate, wherein the plate has an aligned grain microstructure characterized by an X-ray diffraction pattern (CuKα radiation, λ=1.54056 Å) comprising a (006) peak at 41.7° (2θ±0.2°) and (0012) peak at 90.6° (2θ±0.2°) as the two primary peaks.

In one embodiment regarding the alumina-based plate, wherein the plate has an aligned grain microstructure further characterized by a rocking curve of X-ray diffraction, with a full width at half max (FWHM) of less than 20 degrees and r order parameter of less than 0.5.

A. Experimental Procedure

Powder Preparation

RonaFlair® White Sapphire (Merck KGaA, EMD Performance Materials) platelet alumina powder was used. It has a platelet morphology as shown in FIG. 1, with a diameter and thickness of approximately 11 and 0.5 μm, respectively. The impurity content of the powder was measured via inductively coupled plasma mass spectrometry (ICP-MS), and was found to contain 0.012% Ca, 0.002% Cr, 0.018% Fe, 0.001% K, 0.26% Na, 0.015% Si, and 0.002% Ti (weight percent). The platelet alumina powder was washed in ethanol and heated at 105° C. overnight in air to evaporate the ethanol, then sieved through a 250 μm nylon mesh to break apart soft agglomerates (P1 in Table I). For some samples, the ethanol-washed/evaporated powder was heated-treated at 1100° C. for 1 hour in air prior to sieving (P2 in Table I). The specific surface area of the ethanol-washed and heat-treated powder was 2.00±0.03 and 1.13±0.02 m²/g, respectively, as measured by the Brunauer-Emmett-Teller (BET) method. The mass-loss of the ethanol-washed and heat-treated powders were measured by high-temperature thermogravimetric analysis (TGA) under flowing air. FIG. 1 illustrates SEM micrograph of ethanol-washed (P1) RonaFlair platelet-morphology alumina powder.

Hot-Pressing

Figure 13:
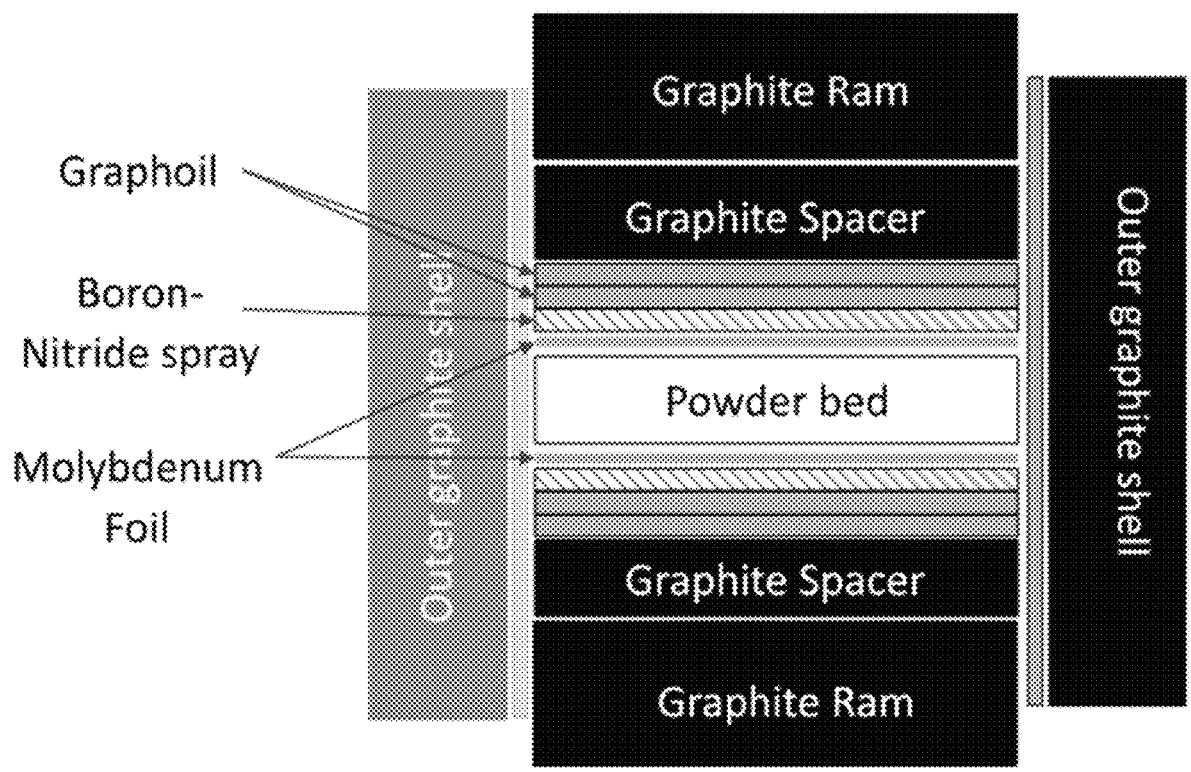
FIG. 13 illustrates a diagram of setup for hot-pressing process.

Hot-pressing was performed using a graphite die with an inner diameter of 25.4 mm. Molybdenum foil sheets (0.14 mm thick) were placed above and below the powder bed, and a layer of graphoil (0.26 mm thick) and boron nitride spray between the molybdenum sheets and the graphite spacers. See FIG. 13. This assembly prevented the alumina samples from bonding to the graphite spacers, and reduced carbon contamination from the graphite die. 6.0 grams of the sieved powder were poured into the graphite die, and uniaxially cold-pressed at approximately 7 MPa to initially consolidate the powder (determination of the green density of the powder compacts at this stage is discussed below). The resistively-heated graphite hot-press furnace (Centorr, Testorr™ series) was constructed such that it sits within a hydraulic load frame (MTS, Model 312.21). The assembled graphite die was placed in the furnace chamber and a vacuum was pumped for approximately 12 hours, until a 40 to 50 millitorr (5.3 to 6.7 Pa) vacuum was achieved, and a vacuum of better than 150 millitorr (20 Pa) was maintained from room temperature to 1550° C. At 1550° C., the vacuum was turned off and the furnace chamber was backfilled with high-purity gettered nitrogen, which continuously flowed at approximately 4 liters/min and 2 psi ($1.4 \times 10^4$ Pa) for the remainder of the hot-press run. A vacuum atmosphere may be beneficial for removing volatiles during hot-pressing of transparent ceramics. However, alumina will severely react with graphite in a vacuum atmosphere above 1600° C., whereas only minimal reactions were observed in a nitrogen atmosphere even up to 1825° C. in the present study. The pre-load pressure ($P_i$, 0 to 8 MPa) was applied to the die at room temperature and maintained during heating (25° C./min) to the maximum temperature. For $P_i=0$ MPa, the top platen of the load frame was positioned ~5 mm away from the top ram of the assembled hot-press die, allowing the die to expand freely during heating. The furnace was controlled by a C-type thermocouple positioned near the edge of the graphite die for temperatures up to 1500° C., and a pyrometer viewing the edge of the graphite die for temperatures above 1500° C. When the furnace reached the maximum temperature ($T_{max}$, 1750 to 1825° C.), the maximum pressure ($P_{max}$, 2.5 to 80 MPa) was applied at a rate of 1.3 MPa/min. After the maximum pressure was achieved, the furnace was held at $T_{max}$ and $P_{max}$ for the isothermal hold time ($t_{iso}$, 1 to 7 hours). The pressure was removed prior to cooling (25° C./min), and the ~2.8 mm thick transparent alumina sample was removed from the die. Load and ram displacement were recorded throughout the run.

Sample Polishing, Density Measurements, Microscopy, and X-Ray Diffraction

Hot-pressed samples were ground and polished to minimize surface scattering. A 100-grit metal-bonded diamond grinding wheel was used to machine equal amounts of material from each side of the samples to a thickness of approximately 1.5 mm. Both sides of the samples were polished down to a 1 μm diamond suspension, resulting in final thicknesses ranging from 1.15 to 1.40 mm.

The geometric green-body densities of the powder compacts at the start of a given hot-press run were determined. The mass of powder (6.0 g) and diameter of the compacts (25.4 mm) are constants, but the height of the compact will change depending on the powder type (EtOH-wash vs. heat-treated) and pre-load pressure (0 to 8 MPa), resulting in different green-body densities. The heights of the compacts were determined by subtracting the height of an empty (no powder) hot-press die under a given pre-load pressure from the height of a prepared (6.0 g of powder) hot-press die under the same pre-load pressure. Geometric green-densities can then be calculated with this height, and are shown in Table I. The densities of the hot-pressed samples were measured using the Archimedes method, accounting for the temperature-density dependency of the distilled water (21.2° C.), resulting in a standard error of ±0.09%. A commercially available piece of single-crystal sapphire was measured alongside the hot-pressed samples, resulting in a density of 3.977 g/cm³. Relative densities of the samples were calculated by dividing their density by the density of the single-crystal sapphire standard, and are listed in Table I.

TABLE I

Processing parameters and microstructural properties of hot-pressed alumina samples

| | | Hot-Pressing Parameters | | | | Relative Density (% TD) | | |
|---|---|---|---|---|---|---|---|---|
| Sample ID | Powder and treatment | Max Temperature, $T_{max}$ (° C.) | Pre-Load Pressure, $P_i$ (MPa) | Max Pressure, $P_{max}$ (MPa) | Isothermal Hold Time, $t_{iso}$ (hr) | Green-body (geometric, ±0.1%) | Hot-pressed (Archimedes, ±0.03%) | Grain size (μm) |
| P1-1750-2-40-5 | P1 | 1750 | 2 | 40 | 5 | 45.1 | 99.74 | 34.1 ± 3.3 |
| P1-1775-2-40-5 | P1 | 1775 | 2 | 40 | 5 | 45.1 | 99.74 | 38.6 ± 5.0 |
| P1-1800-2-40-5 | P1 | 1800 | 2 | 40 | 5 | 45.1 | 99.82 | 52.3 ± 6.3 |
| P1-1825-2-40-5 | P1 | 1825 | 2 | 40 | 5 | 45.1 | 99.80 | 75.7 ± 15.3 |
| P2-1800-0-40-5 | P2 | 1800 | 0 | 40 | 5 | 37.2 | 99.81 | 61.1 ± 8.6 |
| P2-1800-2-40-5 | P2 | 1800 | 2 | 40 | 5 | 40.2 | 99.64 | 57.2 ± 8.4 |
| P2-1800-4-40-5 | P2 | 1800 | 4 | 40 | 5 | 41.2 | 99.80 | 49.9 ± 6.1 |
| P2-1800-8-40-5 | P2 | 1800 | 8 | 40 | 5 | 43.3 | 99.89 | 45.4 ± 6.5 |
| P2-1800-0-2.5-5 | P2 | 1800 | 0 | 2.5 | 5 | 37.2 | 99.09 | 69.8 ± 15.0 |
| P2-1800-0-5-5 | P2 | 1800 | 0 | 5 | 5 | 37.2 | 99.66 | 57.7 ± 11.7 |
| P2-1800-0-10-5 | P2 | 1800 | 0 | 10 | 5 | 37.2 | 99.93 | 61.8 ± 11.6 |
| P2-1800-0-20-5 | P2 | 1800 | 0 | 20 | 5 | 37.2 | 99.81 | 57.2 ± 7.2 |
| P2-1800-0-40-5 | P2 | 1800 | 0 | 40 | 5 | 37.2 | 99.81 | 61.1 ± 8.6 |
| P2-1800-0-80-5 | P2 | 1800 | 0 | 80 | 5 | 37.2 | 99.79 | 60.2 ± 10.8 |
| P2-1800-0-10-1 | P2 | 1800 | 0 | 10 | 1 | 37.2 | 99.68 | 29.3 ± 2.1 |
| P2-1800-0-10-3 | P2 | 1800 | 0 | 10 | 3 | 37.2 | 99.72 | 43.4 ± 5.6 |
| P2-1800-0-10-5 | P2 | 1800 | 0 | 10 | 5 | 37.2 | 99.93 | 61.8 ± 11.6 |
| P2-1800-0-10-7 | P2 | 1800 | 0 | 10 | 7 | 37.2 | 99.89 | 64.7 ± 9.3 |
| E3-1825-0-40-5[a] | E3 | 1825 | 0 | 40 | 5 | N/A | 99.96 | 92.0 ± 20.3 |

Note:
Powder P: Platelet morphology alumina powder, RonaFlair ® White Sapphire, Merck KGaH.
Powder E: Equiaxed morphology alumina powder, AA03, Sumitomo
Treatment 1: Ethanol-washed
Treatment 2: Ethanol-washed & heat-treated at 1100° C. for 1 hr in air
Treatment 3: As Received TABLE I-continued Processing parameters and microstructural properties of hot-pressed alumina samples

| | | Hot-Pressing Parameters | | | | Relative Density (% TD) | | |
|---|---|---|---|---|---|---|---|---|
| Sample ID | Powder and treatment | Max Temperature, $T_{max}$ (° C.) | Pre-Load Pressure, $P_i$ (MPa) | Max Pressure $P_{max}$ (MPa) | Isothermal Hold Time, $t_{iso}$ (hr) | Green-body (geometric, ±0.1%) | Hot-pressed (Archimedes, ±0.03%) | Grain size (µm) |

[a]Sample replicated with similar powder and parameters. See Sellers, D J P, Rhodes, W H L, Vasilos, T W. United States Patent, Method of Preparing Transparent Alumina. United States: United States Patent Office; 3,899,560, 1975.

Cross-sections of the samples were polished to a 1 µm diamond finish, and thermally etched at 1600° C. for 30 minutes in air. The samples were sputter-coated with Au—Pd, and the microstructures were observed by scanning electron microscopy (SEM) with a FEI Quanta650 at 10 kV. Line intercept analysis was performed, obtaining at least 200 intersections. The average intercept length was multiplied by the geometric factor 1.56 to obtain the average grain size.

The crystallographic orientation of the hot-pressed samples were determined via X-Ray Diffraction (XRD) on a Panalytical Empyrean Diffractometer (Malvern Panalytical Ltd, Royston, UK). The instrument was equipped with a bent Ge incident beam monochromator that is tuned to transmit Cu K$\alpha_1$ radiation. Intensity was measured from a 2θ of 20 to 95°. Scans of the top surfaces of the samples were obtained, and maximum intensities were normalized to a value of 1 for ease of comparison.

Optical Measurements

Optical measurements were made using a PerkinElmer Lambda 950 UV-VIS-NIR spectrophotometer equipped with an integrating sphere. The visible spectrum was measured from 200-800 nm using a photomultiplier tube (PMT) detector, and the near-infrared (IR) spectrum was measured from 1000-2500 nm using a lead sulfide (PbS) detector. A wavelength of 645 nm was chosen as the representative value for optical properties in the present study, which is a similar wavelength used in the literature. Total transmission, in-line transmission, reflection, and absorption can be measured using the spectrophotometer, and the forward and backward scattering can be derived from them.

Figure 2:
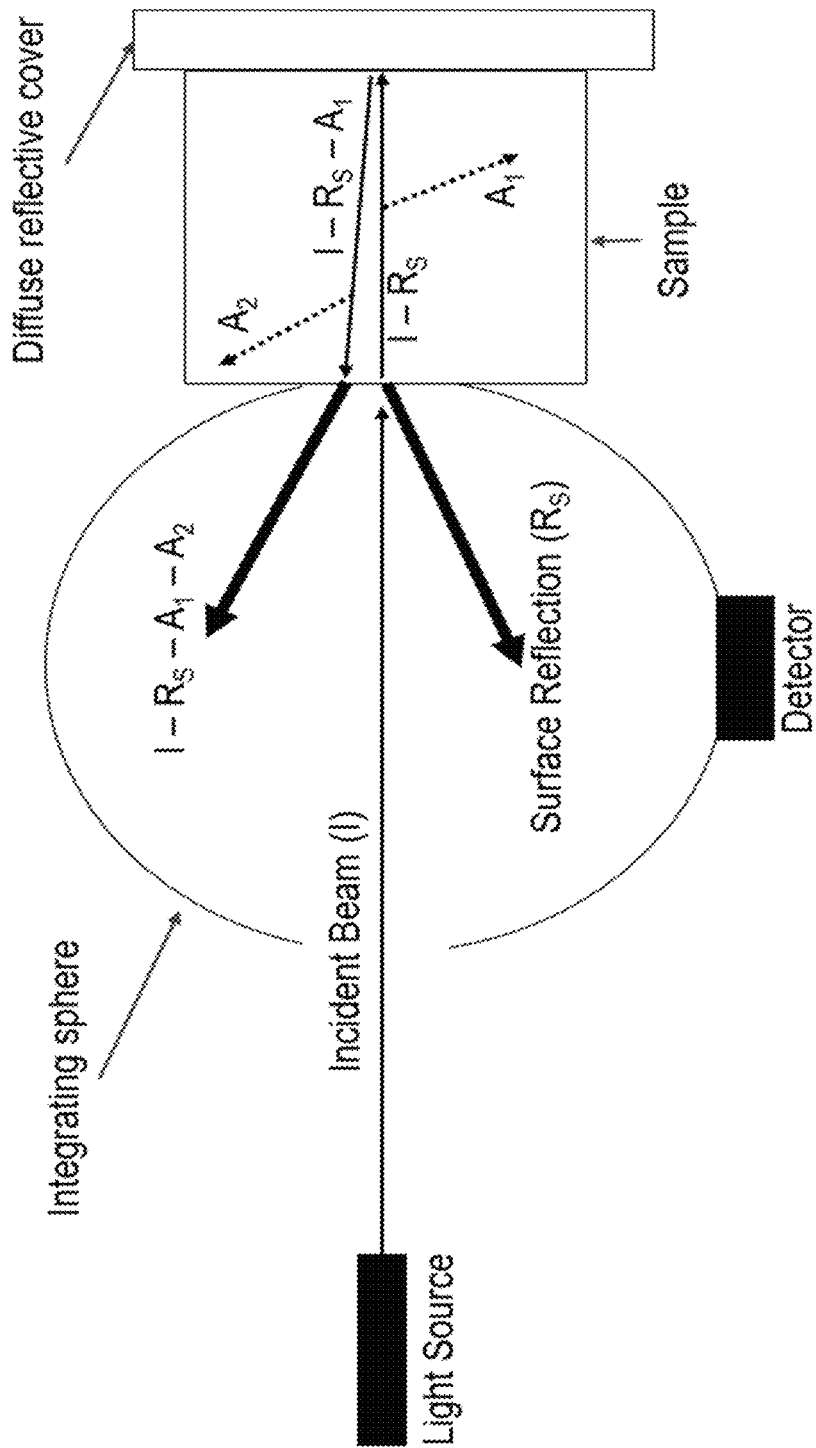
FIG. 2 illustrates Ray diagram illustrating direct measurement of light absorption. The bold arrows indicate the raw light intensity that is measured by the detector ($I_{raw}$), and the dotted lines indicate the light lost to absorption ($A_1=A_2=A$). This configuration and sample size are not to scale.

Total transmission ($T_T$) was measured by placing the sample directly against the edge of the integrating sphere, allowing all light that passes through the sample to enter the integrating sphere and be measured. In-line transmission ($T_{ILT}$) was measured by positioning the sample approximately 60 cm away from a 1.0 cm diameter aperture placed in front of the integrating sphere. Given the distance between the sample and the aperture, as well as the diameter of the aperture, all light that is scattered at an angle greater than an approximately 0.5° cone is not measured. This falls under the definition of "Real In-Line Transmission", as defined by Apetz et al. See Apetz R, Bruggen M P B Van. Transparent Alumina: A Light-Scattering Model. J Am Ceram Soc. 2003; 86(3):480-6. Reflection (R) was measured using an arrangement similar to that of Apetz et al., where the sample was placed directly against an inlet on the back-side of the integrating sphere. Absorption (A) was measured using a configuration similar to the reflection measurement, except a diffuse reflective cover was placed behind the sample, as shown in FIG. 2.

Absorption, forward scattering ($T_{FS}$), and backward scattering ($R_{BS}$) are calculated by Equations 1, 2, and 3, respectively:

$$A = \frac{I - I_{raw}}{2} \quad 1$$

$$T_{FS} = T_T - T_{ILT} \quad 2$$

$$R_{BS} = R - R_S \quad 3$$

Where I is incident beam, $I_{raw}$ is the raw light intensity measured by the detector during the absorption measurement, and $R_S$ is the surface reflection of a single-crystal sapphire sample that was ground/polished using the same procedures as the hot-pressed samples. The optical properties of the sapphire sample were measured and used as a comparison.

Total transmission, in-line transmission, forward scattering, backward scattering, and absorption of transparent polycrystalline ceramics are all thickness dependent.[3] A thicker sample will have a lower total and in-line transmission, and a higher forward scattering, backward scattering, and absorption. Grinding and polishing the hot-pressed samples to a consistent thickness was challenging, so it was necessary to normalize the optical properties of the samples to the same thickness. A modified version of Krell et al.'s equation was used to normalize the optical properties of the hot-pressed samples to a thickness of 0.8 mm, which is the thickness most commonly reported in the literature. See Krell A, Blank P, Ma H, Hutzler T, Van Bruggen M P B, Apetz R. Transparent Sintered Corundum with High Hardness and Strength. Am Ceram Soc. 2003; 86(1):12-8.

B. Results and Discussion

Effect of Maximum Temperature

Figure 3:
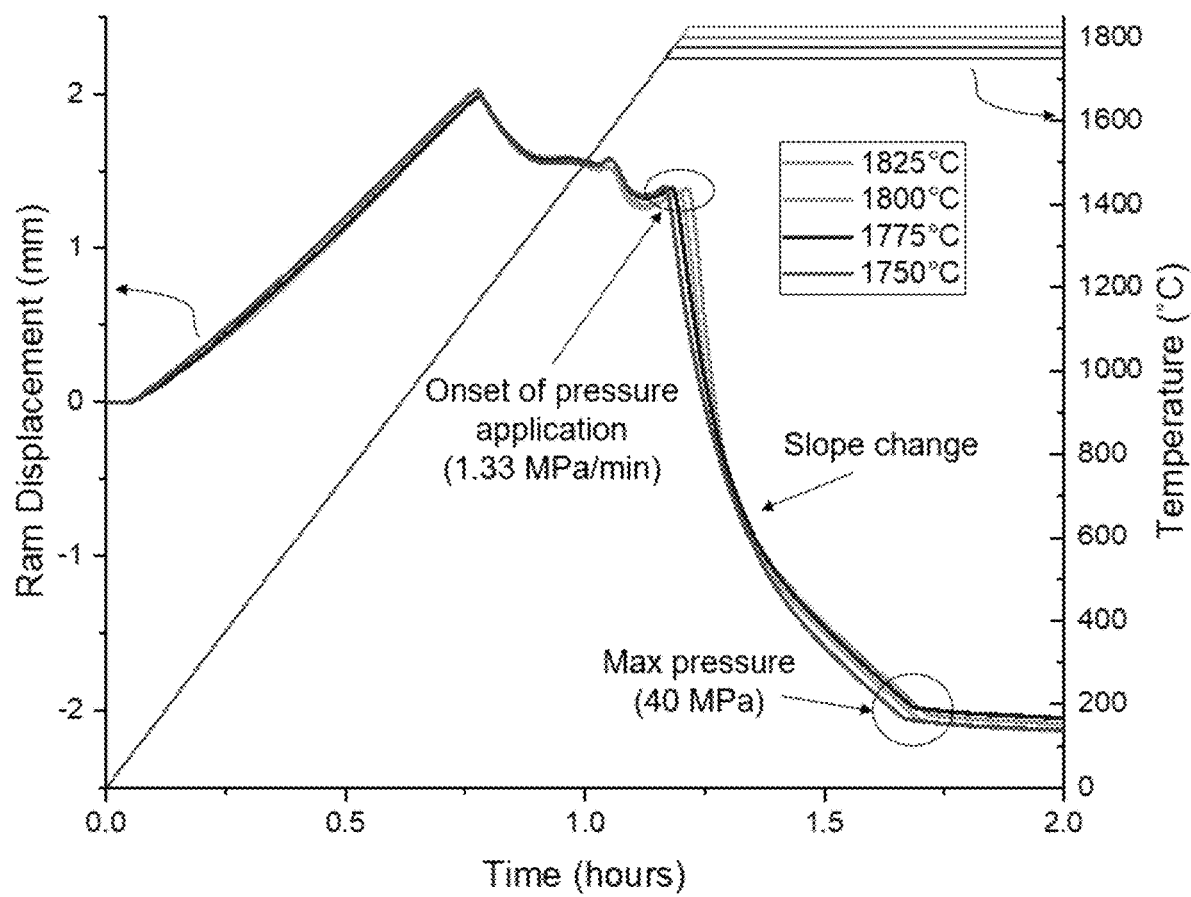
FIG. 3 illustrates Ram displacement versus time of samples hot-pressed at different maximum temperatures.

The maximum temperature ($T_{max}$) during hot-pressing is important as there must be enough thermal activation to achieve adequate diffusion for densification. FIG. 3 shows the ram displacement over time for samples hot-pressed at $T_{max}$ between 1750 and 1825° C. The displacement was normalized to zero at time equal to zero to show the total amount of displacement for each sample. To observe the sintering behavior during heating, a small pre-load pressure ($P_i$=2 MPa) was applied. All curves initially increase due to thermal expansion, then begin to shrink at approximately 1175° C., indicating the onset of densification. An anomaly in the data is observed for all curves at ~1550° C., where the samples appear to suddenly expand then shrink. This expansion/shrinkage is due to the furnace chamber being back-filled with gettered nitrogen, which changes the pressure being exerted on the load cell. At $T_{max}$ (1750° C. to 1825° C.), the sudden shrinkage is due to the application of the maximum pressure. The onset of this shrinkage is offset by 1 minute for the different $T_{max}$ because the respective temperature is reached after different times at a constant heating rate of 25° C./min. At the onset of pressure application, the rate of displacement is higher at higher maximum temperatures. This is because alumina will plastically deform more readily at higher temperatures. After approximately 1.3 hr, the slope of each curve spontaneously decreases, which is discussed in more detail in a later section. Once the maximum pressure is reached after about 1.7 hr, continued shrinkage is minimal, as the powder bed has nearly completely densified.

It was found that an increase in $T_{max}$ resulted in a minimal change in final sample densities and a significant increase in grain size, as shown in Table I. Samples sintered at a $T_{max}$ of 1750 and 1825° C. have a grain size of 34 and 75 μm, respectively. The larger grain size at lower temperatures observed in the current study may be due to the larger starting particle size (11 μm diameter) of the platelet-alumina powder.

Figure 4:
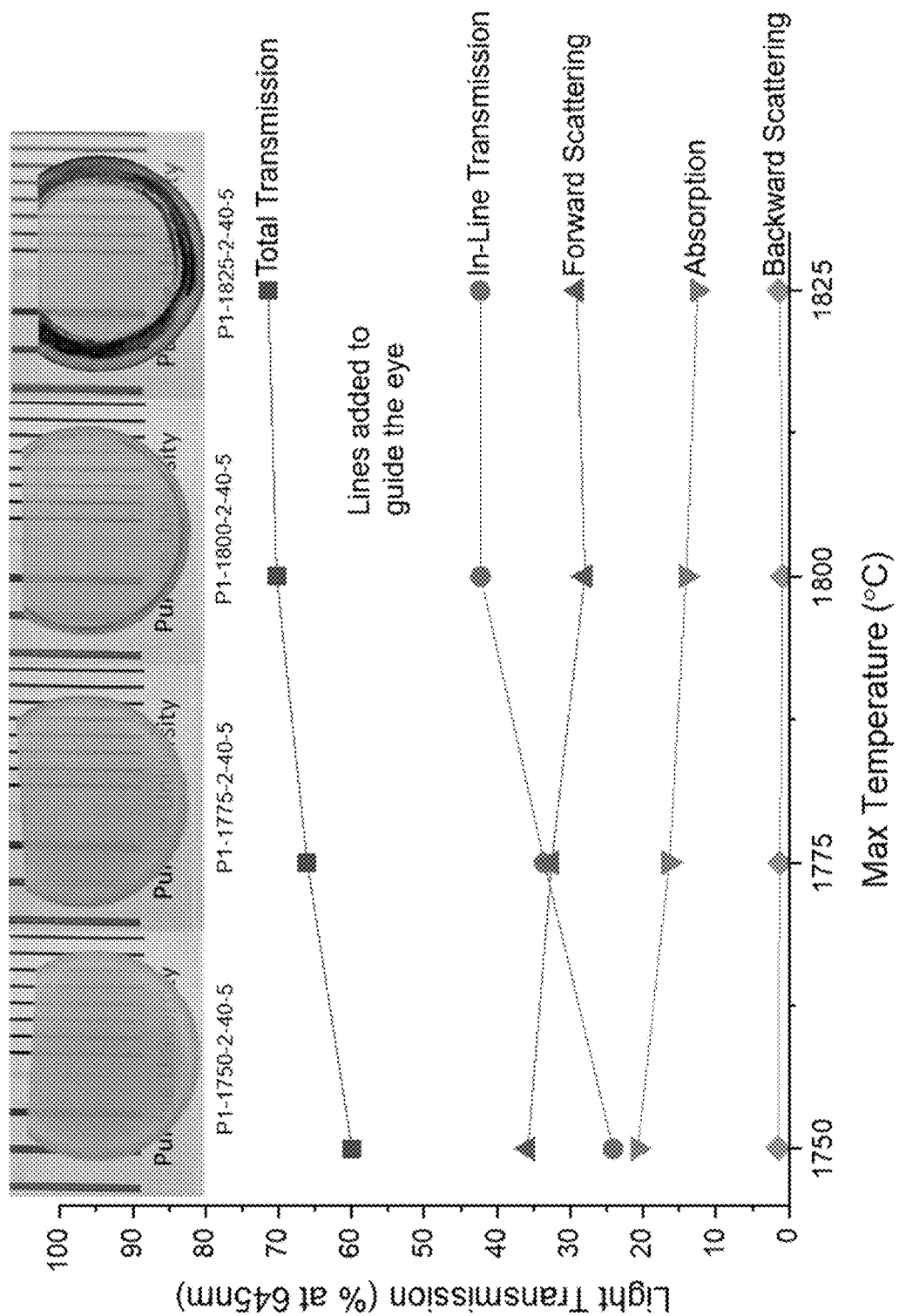
FIG. 4 illustrates light transmission as a function of maximum temperature, normalized to t=0.8 mm. Samples are placed 2 cm above the text, in order of increasing temperature.

The optical properties of samples hot-pressed at different $T_{max}$ are shown in FIG. 4. The total and in-line transmission both increase with increasing $T_{max}$. There are minimal losses due to backward scattering, which implies that these samples have very little porosity, as supported by the high relative densities of these samples (Table I). Most of the optical losses are due to forward scattering and absorption, which decrease with increasing temperature. Accordingly, these samples still have significant birefringence effects and impurities. A gray discoloration is observed in the bulk of all samples, and a severe black discoloration is observed at the outer perimeter of the sample hot-pressed at 1825° C. (P1-1825-2-40-5). The reason for this is not clearly understood. However, 1825° C. is close to the eutectic between alumina and aluminum-carbide, so there may be some reaction occurring between the graphite die and the alumina powder. 1800° C. was chosen as the optimal $T_{max}$ to prevent such a reaction, but discoloration is still present in the interior of the hot-pressed samples. Therefore, parameters that have been reported to minimize this discoloration were explored.

Effect of Powder Heat-Treatment and Pre-Load Pressure

The discoloration observed in the hot-pressed alumina samples is a defect that is common in transparent spinel. Two methods were found that reduce this defect: a heat-treatment of the powders prior to densification, and an application of different pre-load pressures ($P_i$) during heating. Both methods were explored in the current study.

Figure 5:
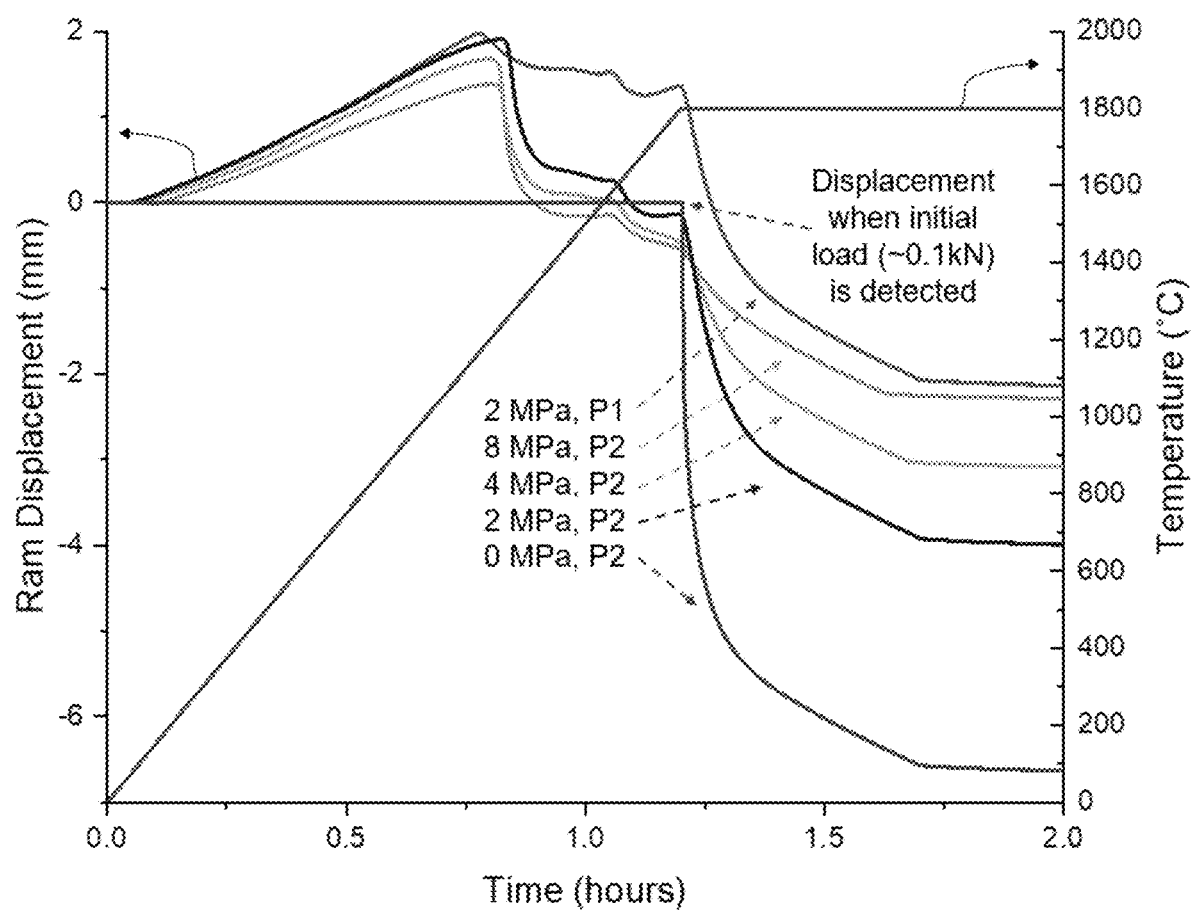
FIG. 5 illustrates Ram displacement versus time of ethanol-washed (P1) and heat-treated (P2) samples hot-pressed at different pre-load pressures.

FIG. 5 shows the ram displacement versus time for samples hot-pressed with or without a powder heat-treatment, and at different pre-load pressures ($P_i$). Samples with $P_i$=2, 4, and 8 MPa initially expand due to thermal expansion. No such expansion is observed for $P_i$=0 MPa because the top platen of the load frame was not in contact with the assembled hot-press die, allowing the die to expand freely during heating. Samples hot-pressed at higher pre-load pressures expand at a slower rate, which is likely due to the higher pre-load pressures promoting particle rearrangement. Shrinkage begins at 1175° C. for the ethanol-washed powders, and 1250° C. for the heat-treated powders, indicating the onset of densification. This onset of densification at a lower temperature for the ethanol-washed powders may be due to it having a higher green-body density than the heat-treated sample: 45.1% (P1-1800-2-40-5) vs. 40.2% (P2-1800-2-40-5), as shown in Table I. However, when the onset of densification begins for the heat-treated powder samples, it occurs at a much faster rate than the ethanol-washed powder sample, and samples hot-pressed with higher $P_i$ undergo more shrinkage (densification) during this stage due to the increased driving force for sintering from the applied $P_i$. It is likely that by heat-treating the powder prior to densification, impurities in the powder are removed, which may allow the powder to densify more readily. High-temperature TGA of the different powder types showed that mass loss initiated around 825° C. and 1200° C. for the ethanol-washed powders and heat-treated powders, respectively. This confirms that some volatile species are being driven from the powders during the heat-treatment. Chemical analysis of the powder indicates that sodium is the most prevalent impurity. The sodium is likely in the form of either sodium carbonate or sodium oxide, both of which thermally decompose well below the heat-treatment temperature of 1100° C.

At the maximum temperature ($T_{max}$=1800° C.), the maximum pressure ($P_{max}$=40 MPa) is slowly applied at a rate of 1.3 MPa/min. During this pressure-application step, the ethanol-washed powder (2 MPa, P1) experienced ~3.4 mm of shrinkage, while the heat-treated powder (2 MPa, P2) experienced ~3.8 mm of shrinkage. This difference in shrinkage is due to the ethanol-washed powder having a higher green density at the start of the hot-press run, as shown in Table I. Additionally, the shrinkage during this step increases with decreasing pre-load pressure: ~1.7 mm at $P_i$=8 MPa and ~6.6 mm at $P_i$=0 MPa. This is because the green densities at the start of the hot-press run are lower at lower pre-load pressures (Table I), yielding a greater amount of displacement when the maximum pressure is applied. For all samples, the slope of the curves spontaneously decreases after approximately 1.3 hr, similar to the behavior observed in FIG. 3, and is discussed in more detail in a later section.

Figure 6:
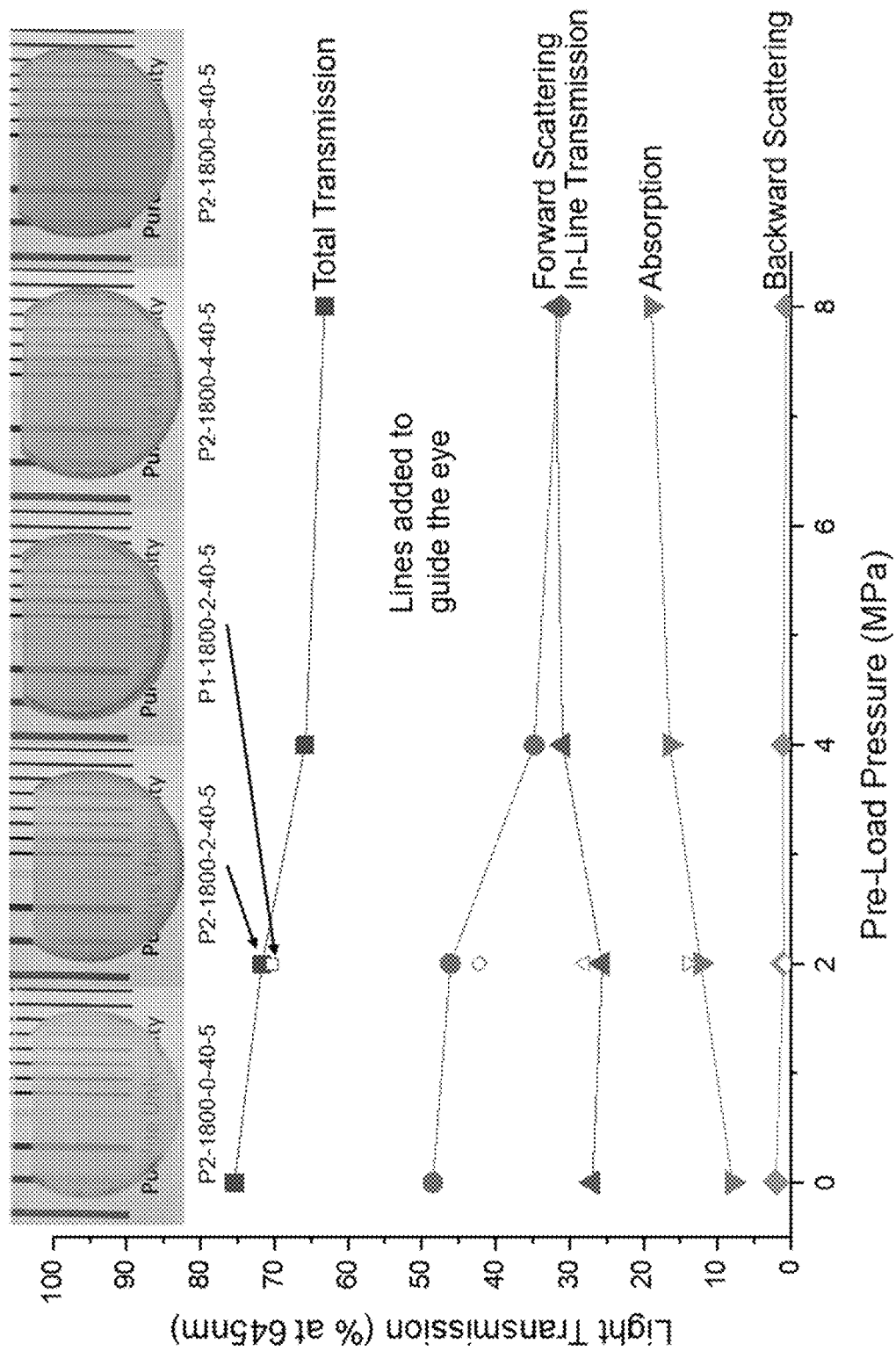
FIG. 6 illustrates light transmission as a function of pre-load pressure, normalized to 0.8 mm. Open points are samples with ethanol-washed powder (P1), and closed shapes are samples with heat-treated powder (P2). Samples are placed 2 cm above the text, in order of increasing pressure.

The effects of the powder heat-treatment on the optical properties are shown in FIG. 6. The ethanol-washed sample at $P_i$=2 MPa (open shapes, P1-1800-2-40-5) has inferior optical properties compared to the heat-treated sample at $P_i$=2 MPa (closed shapes, P2-1800-2-40-5). Losses due to absorption decreases for the heat-treated sample, suggesting that heat-treating the powder at 1100° C. in air prior to hot-pressing causes impurities to be driven off. It has been found that heat-treating spinel powder prior to SPS improved the in-line transmission by 10%, which they claim to be due to impurities being reduced during the heat-treatment. In the current study, the heat-treatment increased the in-line transmission of the hot-pressed platelet alumina by approximately 4%. As previously mentioned, high-temperature TGA indicates that some volatile species are being driven from the powders during the heat-treatment, and sodium is likely the primary impurity being driven off. The removal of the sodium impurity from the powder prior to hot-pressing may explain the decrease in absorption losses for the heat-treated samples. Additionally, TGA showed that some mass loss is still occurring beyond 1100° C., suggesting that a higher heat-treatment temperature, or even longer heat-treatment time, may additionally purify the powders and further reduce optical losses due to absorption.

Pre-load pressure has a more significant effect on the optical properties than heat-treatment, as shown in FIG. 6. The total and in-line transmission both decrease as $P_i$ is increased. $P_i$ has minimal effect on losses due to backward and forward scattering, suggesting that it has a minimal effect on the porosity. The similarities in the hot-pressed densities of these samples confirm this (Table I). Losses due to absorption, however, notably increase with increasing $P_i$. In the present study, a similar phenomenon may be occurring, where a higher $P_i$ results in a higher green-body density (Table I), resulting in less open-porosity for volatiles species to escape. As a result, impurities are entrapped during fast sintering at high $P_i$, and thus more light lost due to absorption. Therefore, a lower $P_i$ is preferred, with 0 MPa being optimal.

Figure 7:
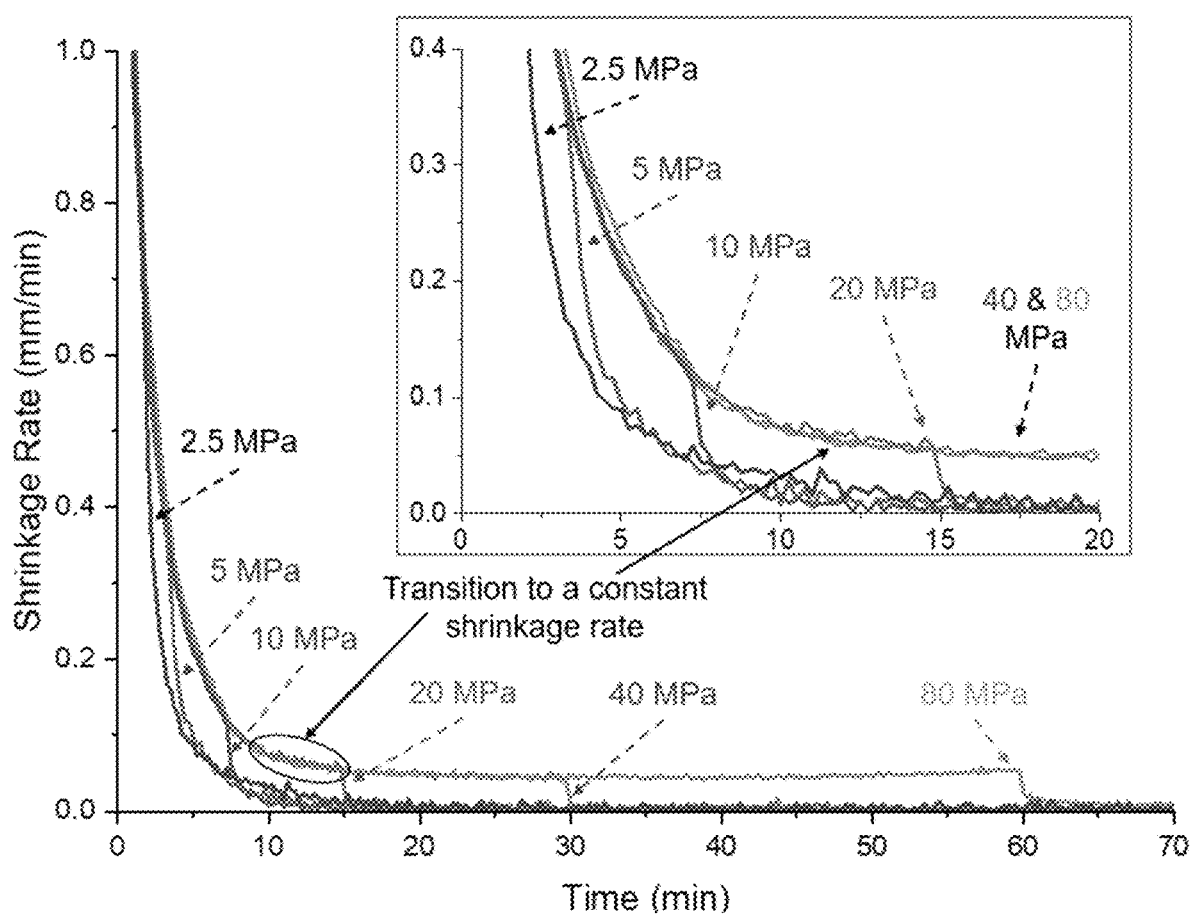
FIG. 7 illustrates Shrinkage rate as a function of time for samples hot-pressed at different maximum pressures. The sudden decrease in each curve indicates when the maximum pressure was achieved.

When hot-pressing ceramics, higher maximum pressure ($P_{max}$) generally results in higher densities and improved optical properties. However, the slope-change of the ram displacement data in FIG. 3 and FIG. 5 implies that there may be an optimum at lower pressures. To investigate this, samples hot-pressed at $P_{max}$ of 2.5 to 80 MPa were studied, and the shrinkage rate versus time for these samples are shown in FIG. 7. The shrinkage rate was calculated by taking the derivative of the displacement data. For each sample, the shrinkage rate is initially high (>1 mm/min), and abruptly decreases when the respective $P_{max}$ is achieved. The 2.5 and 5 MPa samples continue to shrink at a significant rate for approximately 10 minutes after reaching their respective $P_{max}$. This could be due to particle rearrangement, as well as a considerable amount of porosity remaining in the powder bed after these low pressures are applied. On the other hand, the shrinkage rate of samples hot-pressed at $P_{max} \geq 10$ MPa abruptly decreases to virtually 0 mm/min after reaching their $P_{max}$. This is likely due to minimal porosity remaining at this higher pressure.

Another important feature of FIG. 7 is the transition to a constant shrinkage rate of approximately 0.05 mm/min, which begins after approximately 10-minutes. This is more clearly seen in the inset plot. It is important to note that the pressure for all samples in the current study was applied at a constant rate of 1.3 MPa/min, so this transition must be indicative of some phenomenon occurring during the slow application of maximum pressure. This transition corresponds to a pressure of approximately 15 MPa, so it occurs for samples with $P_{max}$ of 20, 40, and 80 MPa. These samples go through this transition and maintain the constant shrinkage rate until their respective $P_{max}$ is achieved, at which point the shrinkage rate promptly decreases to virtually 0 mm/min. It is thought that at pressures beyond 15 MPa, the powder bed has nearly completely densified, remaining porosity is closed-porosity, and any further pressure results in linear-elastic strain of the powder compact and graphite die assembly. Hot-pressing at pressures beyond this transition results in a decrease in density, as shown in Table I. Such results are contradictory to the commonly observed trend that higher pressures result in higher densities (due to an increased driving force for sintering). Therefore, hot-pressing at a pressure that corresponds to the transition to a constant shrinkage rate appears to be optimal for this powder under these conditions.

Table I shows the relative densities of samples hot-pressed at different maximum pressures. Relative density is low at lower maximum pressures (99.09% at $P_{max}$=2.5 MPa), then increases with increasing maximum pressure (99.93% at $P_{max}$=10 MPa). At maximum pressures beyond 10 MPa, the relative densities decrease with increasing maximum pressure (99.79% at $P_{max}$=80 MPa), though differences in density at these pressures may not be statistically different. Lower pressures yielding lower densities is well understood: a lower pressure will result in less driving force for densification. Higher pressures resulting in lower densities is not well understood. A possible explanation for this could be a pore swelling phenomenon that occurs after the maximum pressure is removed. This can be shown by considering the internal pore pressure ($P_p$) during hot-pressing:

$$P_p = P_{max} + \frac{2\gamma}{r_p} \qquad 4$$

Where $P_{max}$ is the externally applied maximum pressure, $\gamma$ is the surface energy of the pore-matrix interface, and $r_p$ is the pore radius. Equation 4 shows that an increase in $P_{max}$ will result in an increase in $P_p$. Additionally, $r_p$ will decrease as the sample densifies, further increasing $P_p$, though the effect of decreasing pore size is minimal when compared to the externally applied maximum pressure. For example, at an externally applied pressure of 80 MPa, and if it is assumed that $\gamma=1$ J/m$^2$ and $r_p=0.5$ m, the internal pore pressure will be 84 MPa. This means that the pore pressure will be effectively equal to the maximum pressure. As described in the Experimental Procedure, the maximum pressure is released at the end of the isothermal hold, prior to cooling. It is thought that when $P_{max}$ is released prior to cooling, $P_p$ is still very high, and the surrounding matrix (which is still at temperatures >1700° C. for several minutes) will creep to relieve the high pore pressure. The pores will swell, resulting in a lower density, and diminished optical properties. This effect will be exacerbated at higher $P_{max}$ due to $P_p$ scaling with $P_{max}$. Furthermore, the transition to a constant shrinkage rate (FIG. 7) may correspond to the $P_{max}$ at which the $P_p$ is too high, resulting in pore swelling when the pressure is released.

It may be possible to mitigate this pore swelling phenomenon by maintaining $P_{max}$ during cooling since the surrounding matrix cannot creep at lower temperatures. Literature regarding SPS of alumina reports that the pressure is typically maintained during cooling. However, maintaining the pressure until the system is cooled to 1000° C. may have retained a smaller pore size since 1000° C. may be low enough temperature to prevent the surrounding matrix to creep under the gas pressure and swell to a lower density.

Figure 8:
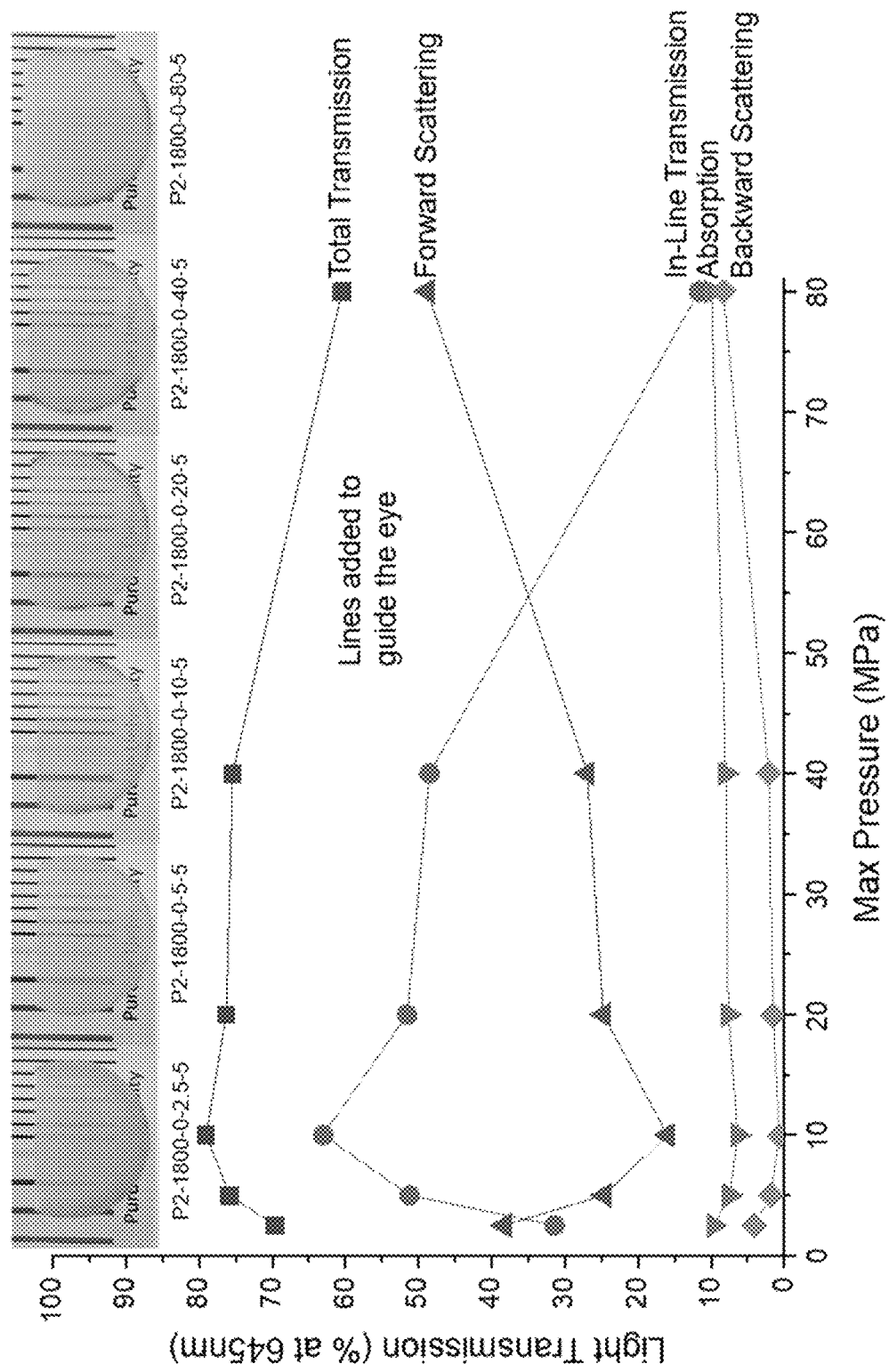
FIG. 8 illustrates Light transmission as a function of maximum pressure, normalized to t=0.8 mm. Samples are placed 2 cm above the text, in order of increasing pressure.

The optical properties of samples hot-pressed at different $P_{max}$ are shown in FIG. 8. The total and in-line transmission both initially increase to a maximum at 10 MPa, then decrease with increasing $P_{max}$. Forward scattering, backward scattering, and absorption follow a reverse trend, where they initially decrease to a minimum at 10 MPa, then increase with increasing $P_{max}$. Forward scattering is the dominating mechanism of loss at all $P_{max}$. A considerable amount of light is also being lost due to absorption, and it reaches a minimum at 10 MPa, but this change in absorption is minimal compared to the changes observed in the other hot-pressing parameters. Backward scattering is also affected by differences in maximum pressure. Backward scattering is approximately 4% at 2.5 MPa, decreases to a minimum of 0.7% at 10 MPa, then increases with increasing $P_{max}$ to 8.3% at 80 MPa. As mentioned earlier, backward scattering is due to residual porosity, so it follows that both too low and too high of maximum pressure is resulting in some amount of porosity. The densities of these samples confirm this, as shown in Table I, though the differences in densities for samples hot-pressed at $P_{max}$>10 MPa may not be statistically significant.

It is notable that the best optical properties at 10 MPa corresponds with the transition to a constant shrinkage rate that was previously discussed. This further reinforces that the transition corresponds to a pressure that is high enough to ensure adequate pore removal yet is low enough to prevent the proposed pore swelling phenomenon. Adequate pore removal, as well as mitigated pore swelling, decreases backward scattering and improves the in-line transmission.

Therefore, it was determined that 10 MPa is the optimal $P_{max}$ for hot-pressing this platelet alumina to transparency.

Effect of Isothermal Hold Time

Figure 9:
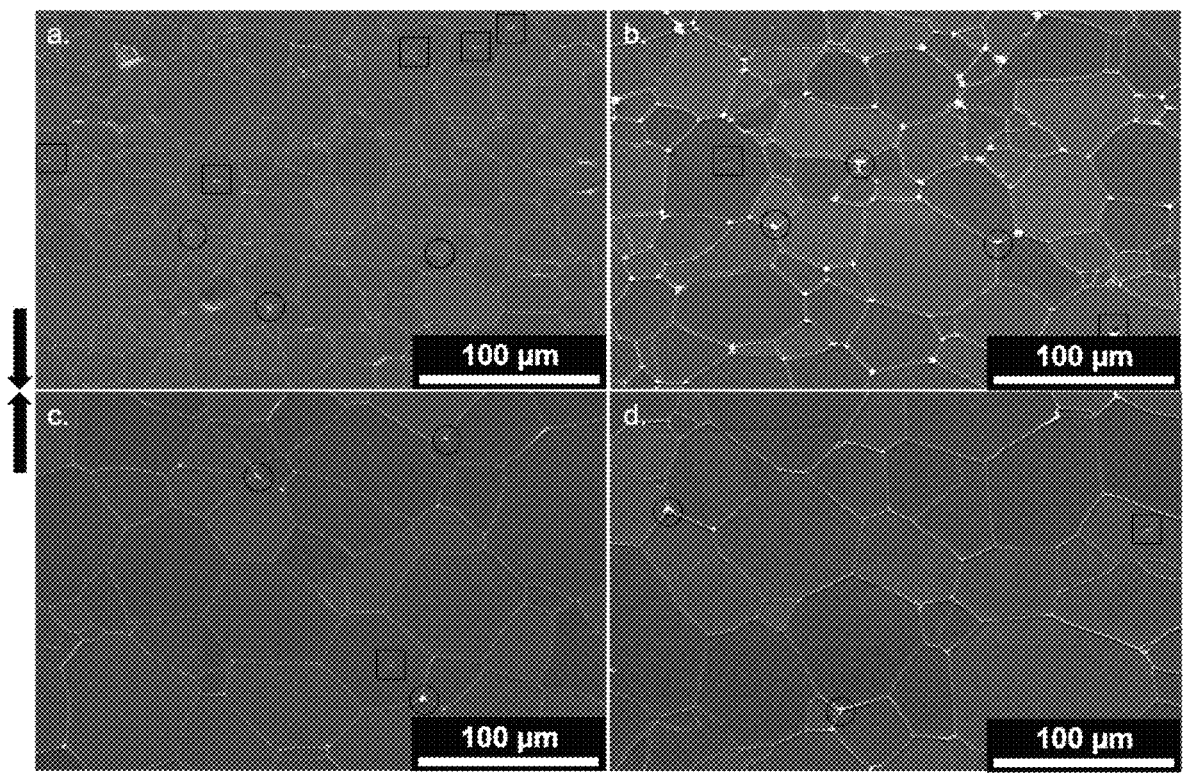
FIG. 9 illustrates SEM micrographs of samples hot-pressed for 1 (a.), 3 (b.), 5 (c.), and 7 (d.) hours. Circles and squares indicate inter and intra-granular porosity, respectively. The arrows indicate the hot-pressing direction.

To ensure adequate density after $P_{max}$ is applied during hot-pressing, an isothermal hold time ($t_{iso}$) is required. However, it is important to determine the minimum amount of $t_{iso}$ required to reach adequate densities, as a shorter time will result in smaller grain sizes. As shown in Table I, the density of samples hot-pressed at different $t_{iso}$ increases with increasing hold time, particularly between 3 and 5 hours, while the density increase from 1-3 hours and 5-7 hours may not be statistically significant. FIG. 9 shows the microstructure of samples hot-pressed at $t_{iso}$ ranging from 1 to 7 hours. After 1 hour, there is a noticeable amount of intragranular porosity (circles). After 3 hours, large white phases (squares) are seen at the triple junctions. This could be the result of remaining secondary phases (impurities) diffusing out along the grain boundaries during thermal etching. After 5 hours, only a few intergranular pores remain, and after 7 hours, the sample is virtually pore-free. This densification at higher $t_{iso}$ occurs at the expense of increased grain growth, as shown in Table I and FIG. 9.

Figure 10:
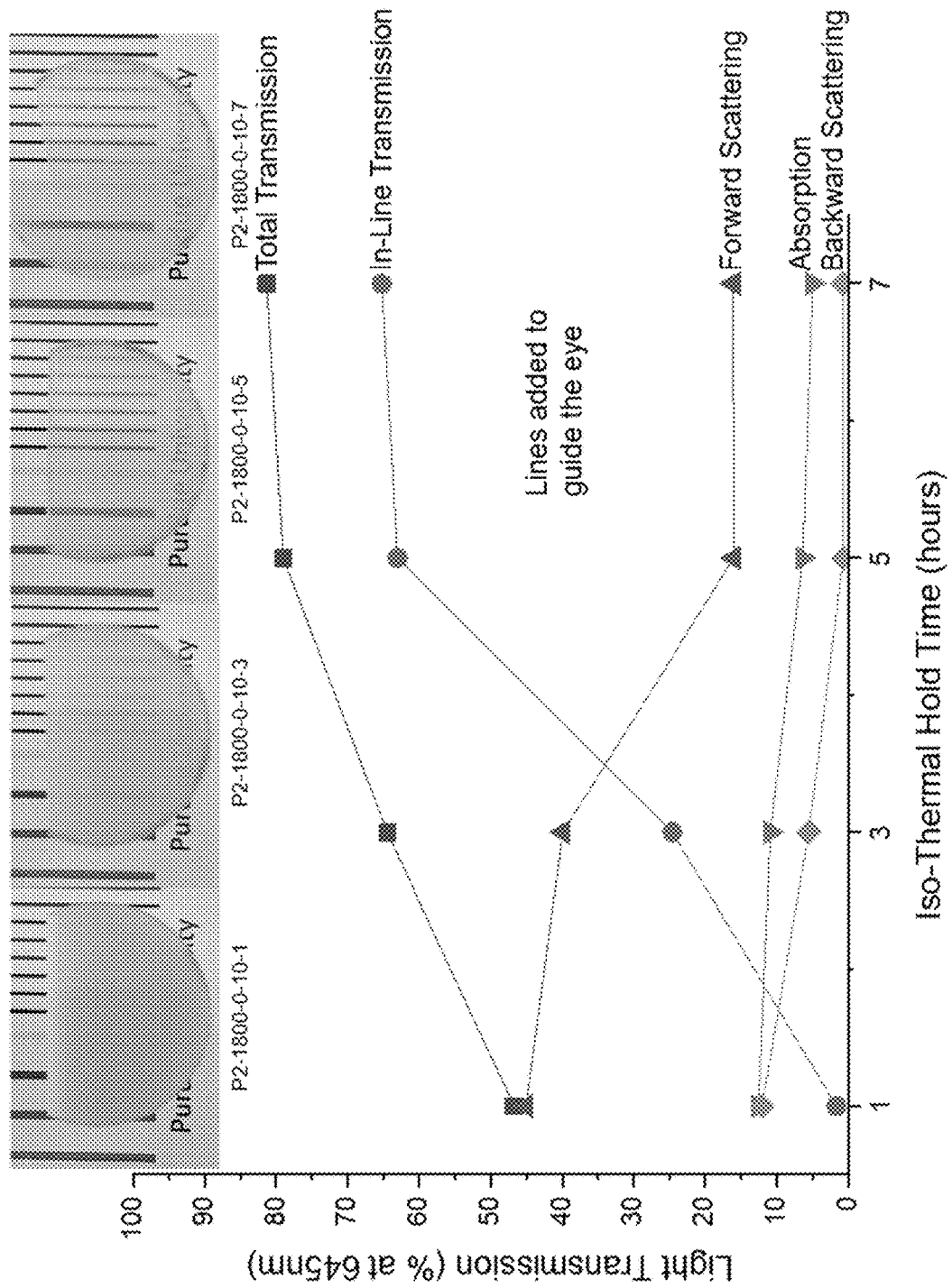
FIG. 10 illustrates Light transmission as a function of isothermal hold time, normalized to t=0.8 mm. Samples are placed 2 cm above the text, in order of increasing time.

The optical properties of samples hot-pressed at different $t_{iso}$ are shown in FIG. 10. The total and in-line transmission both significantly increase with increasing $t_{iso}$. At least 5 hours are required to obtain best optical properties ($T_{ILT}$>60%). The in-line transmission increases from 1.6% at $t_{iso}$=1 hr to 65.3% at $t_{iso}$=7 hrs. For all samples, forward scattering is the dominating mechanism of optical loss. Backward scattering is significant at shorter $t_{iso}$, but decreases with increasing $t_{iso}$, indicating that the samples have lower porosity at longer $t_{iso}$. This is confirmed by the increasing density of the samples with increasing $t_{iso}$, as shown in Table I. Absorption is also steadily decreasing with increasing $t_{iso}$. This is not well understood, though it is possible that residual impurities in the sample are driven off during longer $t_{iso}$. From this data it was concluded that increasing $t_{iso}$ increases the final transparency.

Comparison to Transparent Alumina Using Equiaxed Morphology Powders

Figure 11:
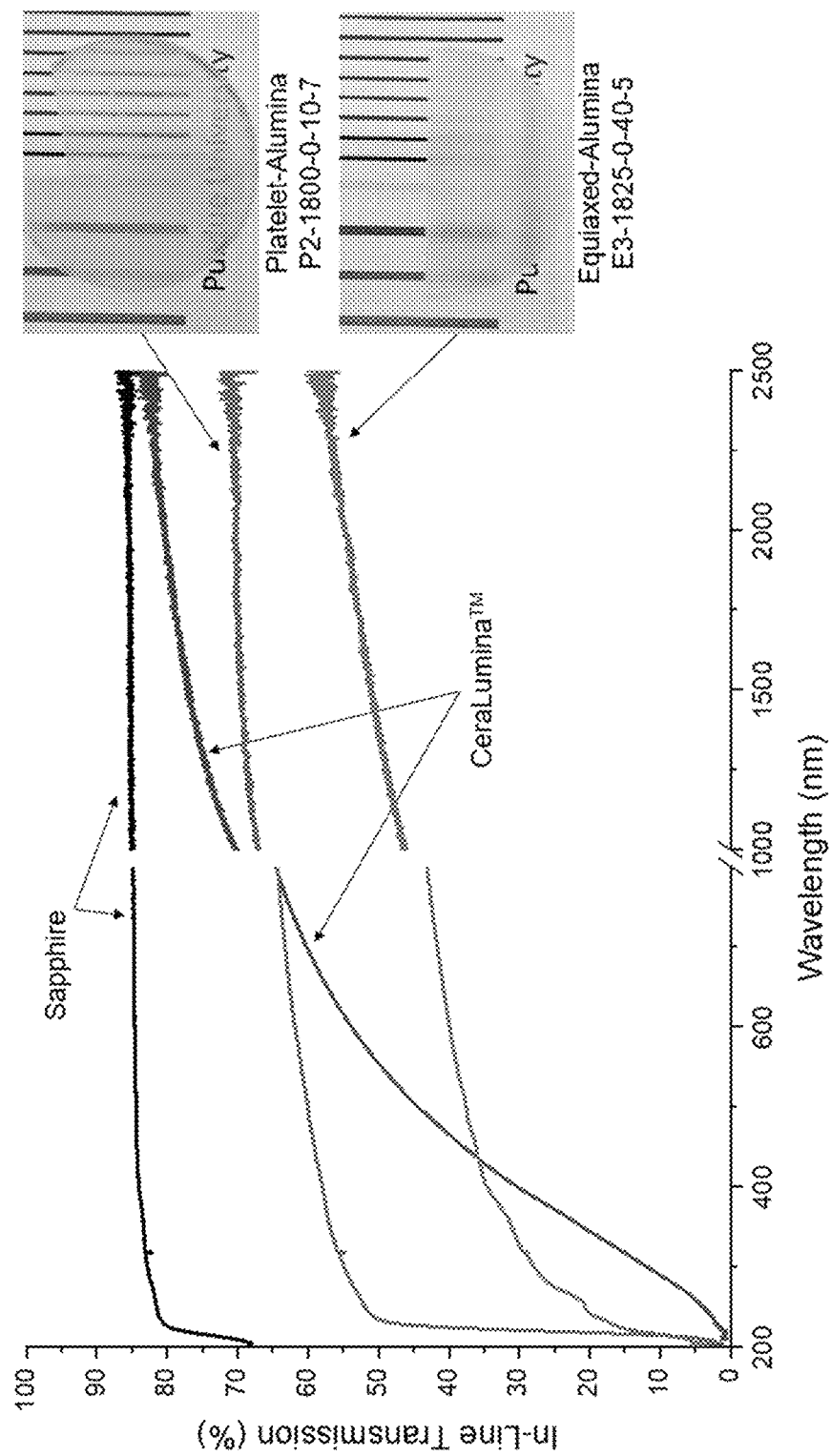
FIG. 11 illustrates In-line transmission as a function of wavelength for a few comparative samples, normalized to t=0.8 mm. Samples are placed 2 cm above the text.

FIG. 11 shows the in-line transmission as a function of wavelength for the best platelet-alumina sample produced in this study (P2-1800-0-10-7), a polished single-crystal sapphire standard, a commercially available transparent polycrystalline alumina sample (Cerallova's CeraLumina™), and a sample produced using equiaxed powder (E3-1825-0-40-5). The discontinuity between the visible and near-IR spectrums are due to the different detectors used. While the in-line transmission of the best platelet-alumina sample does not reach the theoretical maximum of sapphire, it is markedly higher than the equiaxed-alumina, and is much higher than the commercially available sample in the visible spectrum. However, the in-line transmission of the commercially available sample surpasses the transmission of the best platelet-alumina sample in the near-IR wavelength range. The reason for this is not currently understood, though it could be that grain size dependency begins to take prevalence at these higher wavelengths.

The best platelet-alumina sample in this study (P-1800-0-10-7) has an in-line transmission of 65.3% at 645 nm. At the time of publication, and to the best knowledge of the authors, this is the 4$^{th}$ highest in-line transmission reported for transparent alumina. It is noteworthy that this platelet-alumina sample was hot-pressed at lower pressures (10 MPa) when compared to equiaxed-alumina samples from HIP or SPS at higher pressures (>200 MPa). This is particularly remarkable when the low intrinsic driving force for sintering of the large platelets (11 μm in diameter) is considered.

Another noteworthy observation is that the in-line transmission of the platelet alumina sample is high despite its large grain size (>60 μm, Table I), as well as being relatively homogeneous across the entire optical spectrum (compared to the commercially available alumina sample) as shown in FIG. 11. Both behaviors can be explained by Rayleigh-Gans-Debye theory, which relates the in-line transmission of a birefringent polycrystalline ceramic to grain size (r), refractive index mismatch (Δn), sample thickness (d), and wavelength ($\lambda_0$), as shown in Equation 5:

$$T_{ILT} = (1 - R_S)\exp\left(-\frac{3\pi^2 r \Delta n^2 d}{\lambda_0^2}\right) \quad 5$$

This theory shows that in-line transmission will increase with smaller grain sizes and lower refractive index mismatch, and will decrease at lower wavelengths. However, refractive index mismatch has a much greater effect on the in-line transmission because it varies as $\Delta n^2$ (compared to $r^1$). Additionally, as Δn gets sufficiently low, it begins to negate wavelength dependence entirely. Because the platelet alumina sample has such a large grain size, the high and relatively homogeneous in-line transmission must mean that the refractive index mismatch is low. A low refractive index mismatch is related to high crystallographic orientation, which implies that the samples in the present study must have some degree of alignment.

Figure 12:
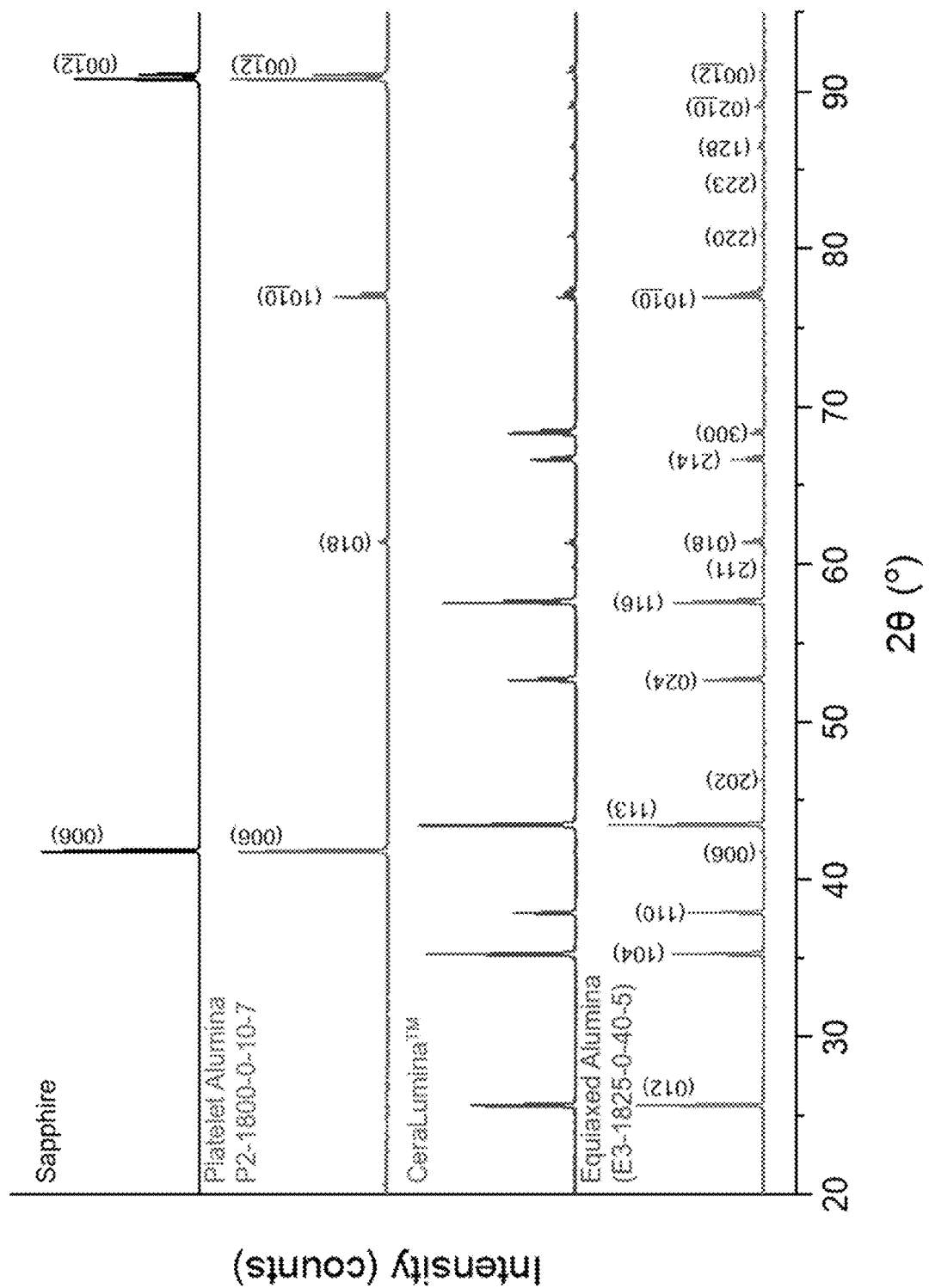
FIG. 12 illustrates X-Ray Diffraction curves of a few representative samples, indicating differences in crystallographic orientation.

XRD curves of a few representative samples are shown in FIG. 12. It is apparent that the (006) and (0012) peaks, which are associated with the basal plane of sapphire, are very intense in the platelet alumina sample, while all peaks associated with the other crystallographic directions of alumina are nearly absent. Yi et. al. observed similar trends in transparent alumina produced using a magnetic field to align equiaxed alumina prior to densification. See Yi H, Mao X, Zhou G, Chen S, Zou X, Wang S, et al. Crystal plane evolution of grain oriented alumina ceramics with high transparency. Ceram Int. 2012 Sep; 38(7):5557-61. They found that samples produced using a higher magnetic field resulted in higher in-line transmission, and XRD curves indicated that these samples had a high degree of crystallographic orientation. The crystallographic orientation in the present platelet alumina samples explains the high in-line transmission despite the large grain size. The crystallographic orientation minimizes birefringent scattering at the grain boundaries and reduces forward scattering losses. While the platelet alumina was not intentionally aligned prior to hot-pressing, it is reasonable to assume that a majority of the high aspect-ratio platelets will tend to lie flat when poured into the die and compacted by uniaxial pressure. Additionally, Heuer et al. observed crystallographic orientation of their sinter-forged equiaxed alumina, so the present samples could be undergoing similar crystallographic orientation as a result of the hot-pressing parameters. See Heuer A H, Sellers D J, Rhodes W H. Hot working of aluminum oxide. 1: Primary recrystallization and texture. J Amer Ceram Soc. 1969; 52:468-74. The XRD curves of the equiaxed and CeraLumina™ samples are also shown in FIG. 12, and the presence of peaks associated with all crystallographic directions indicates a lack of orientation, confirming that these samples have lower in-line transmissions due to birefringent scattering. Finally, while these 20 XRD curves sufficiently indicate crystallographic orientation, they only provide a semi-quantitative analysis of the amount of orientation and does not include any information about the exact degree of mis-alignment of the grains. A more effective analysis method, such as rocking curves or electron back-scatter detection (EBSD), will be used in future studies to study alignment of hot-pressed platelet alumina.

C. Summary and Conclusions

The effect of hot-pressing parameters on the densification and optical properties of platelet-morphology alumina was analyzed. Increasing the maximum temperature improves the optical properties, at the expense of increased grain growth. However, the samples have a distinct gray discoloration. Heat-treating the powder prior to hot-pressing and decreasing the pre-load pressure reduces the discoloration of hot-pressed samples, and hence reduces optical losses due to absorption. The heat-treatment likely removes impurities, and a lower pre-load pressure may allow residual volatiles to escape the powder bed during hot-pressing. A maximum pressure of 10 MPa yielded the highest in-line transmission. Pressures lower and higher than 10 MPa resulted in lower densities, which was confirmed by forward and backward scattering losses. Higher pressures resulting in lower densities is contrary to what is commonly observed in the literature and could be attributed to pore-swelling. It was found that >5 hours of isothermal hold time are required to achieve sufficiently high densities as required for transparency; however, this led to an increase in grain growth. Optical losses at short isothermal holding times are mainly due to backward scattering, which is indicative of residual porosity. A sample fabricated by hot-pressing heat-treated platelet alumina powder with a pre-load of 0 MPa, a maximum temperature of 1800° C., a maximum pressure of 10 MPa, and an isothermal hold time of 7 hrs yielded an in-line transmission of 65.3% at 645 nm, despite a large grain size of 65 μm. The high and relatively homogeneous in-line transmission despite the large grain size is explained by decreased refractive index mismatch at the grain boundaries due to crystallographic orientation.

Those skilled in the art will recognize that numerous modifications can be made to the specific implementations described above. The implementations should not be limited to the particular limitations described. Other implementations may be possible.

We claim:

1. A method of preparing a transparent platelet alumina-based plate by hot-pressing platelet alumina, wherein the method comprises:
    (a) providing a sample consisting of a platelet alumina powder, wherein the platelet alumina powder sample is optionally purified by washing with an organic solvent and then by heating to remove the organic solvent;
    (b) providing a die for hot-pressing, wherein the die is placed in a furnace chamber;
    (c) loading the platelet alumina powder sample into the die;
    (d) uniaxially pressing the platelet alumina powder sample to initially consolidate the platelet alumina powder;
    (e) providing a low pre-load pressure of 0-8 MPa onto the die before a maximum sintering temperature is reached;
    (f) providing a pressure to the sample until a maximum pressure of 2-90 MPa is reached;
    (g) holding the maximum sintering temperature and the maximum pressure for about 5-7 hours to densify the sample; and
    (h) cooling the sample and removing the pressure to provide a hot-pressed alumina-based plate with at least 60% in-line transmission for a light with a wavelength of 645 nm.

2. The method of claim 1, wherein, when the platelet alumina powder sample is washed, the organic solvent used is ethanol and then the platelet alumina powder sample is heated to 100-1,300° C. to remove impurities and to allow the sample to densify.

3. The method of claim 1, wherein the pre-load pressure is 0-1 MPa.

4. The method of claim 1, wherein the maximum pressure is 2.5-85 MPa.

5. The method of claim 1, wherein the maximum sintering temperature is 1,800-1,825° C.

6. The method of claim 1, wherein the time for holding the maximum sintering temperature and the maximum pressure is at least 5 hours to about 7 hours.

7. The method of claim 1, wherein the maximum pressure is 5-15 MPa.

* * * * *